Figure 1:
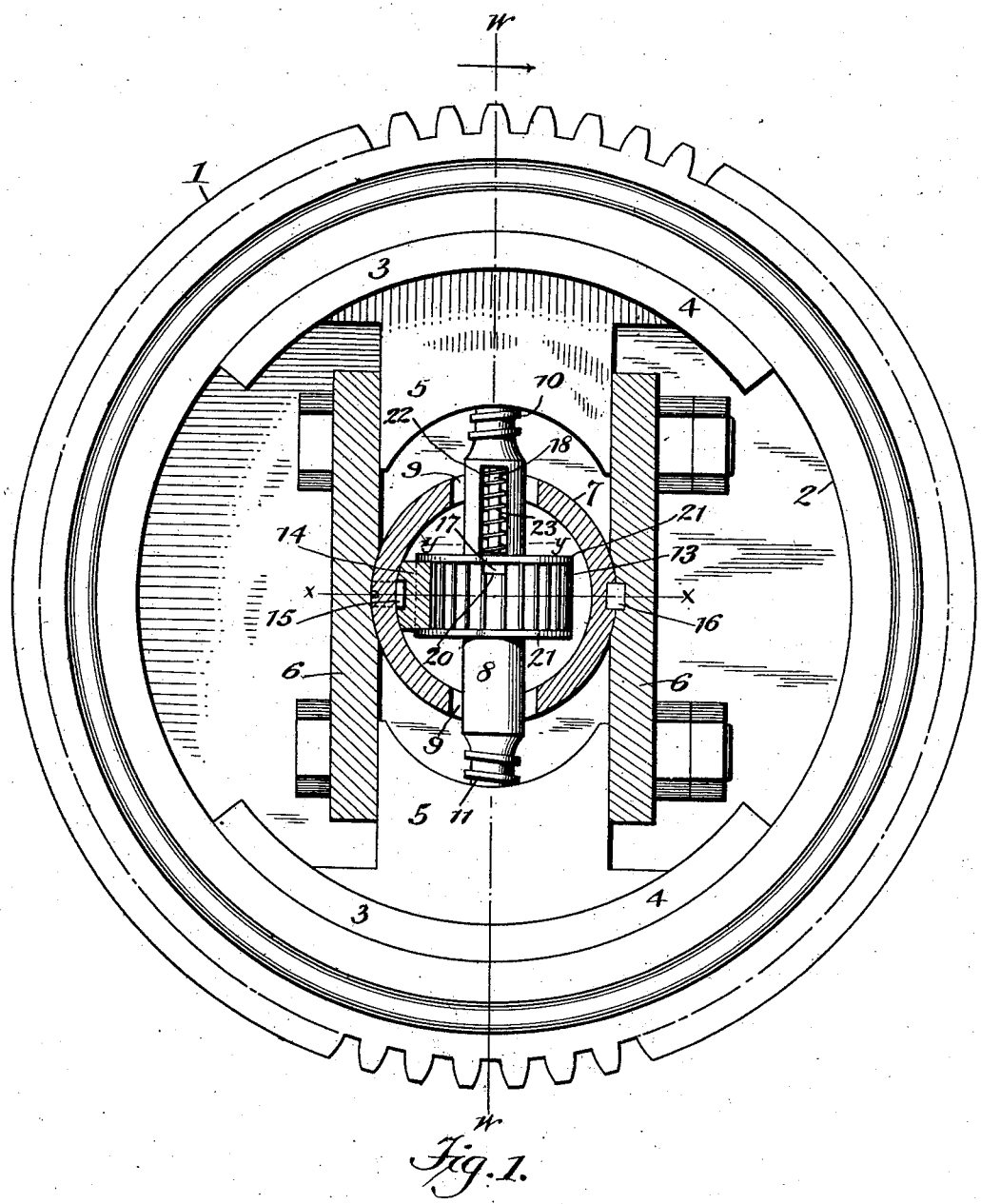

No. 693,963. Patented Feb. 25, 1902.
D. F. GRAHAM.
CLUTCH ADJUSTMENT FOR MOTOR CARRIAGES.
(Application filed Sept. 10, 1901.)

(No Model.) 2 Sheets—Sheet 1.

WITNESSES: INVENTOR
David F. Graham,
BY
his ATTORNEY.

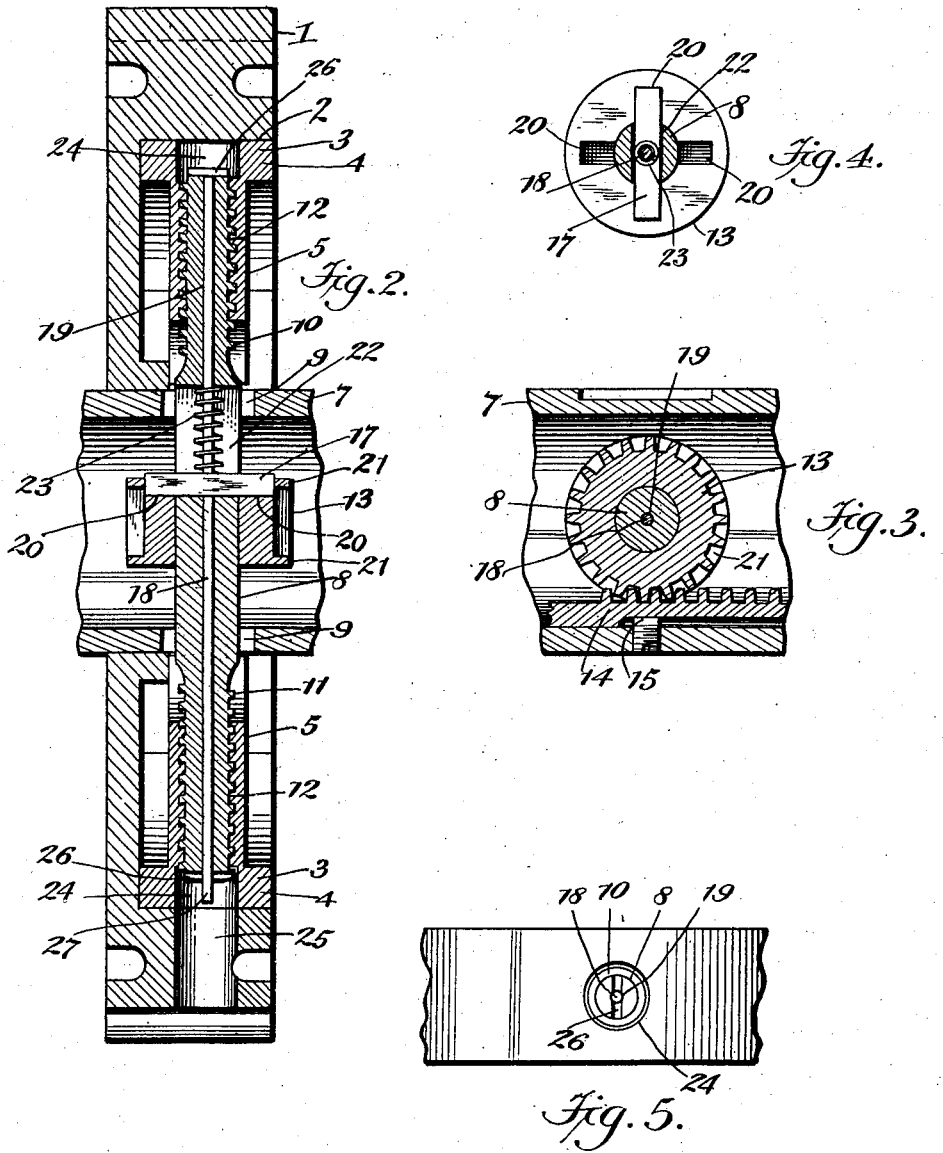

United States Patent Office.

DAVID F. GRAHAM, OF SPRINGFIELD, MASSACHUSETTS, ASSIGNOR TO WALTER DENHOLM BLAKE, OF RICHMOND HILL, NEW YORK, N. Y.

CLUTCH ADJUSTMENT FOR MOTOR-CARRIAGES.

SPECIFICATION forming part of Letters Patent No. 693,963, dated February 25, 1902.

Application filed September 10, 1901. Serial No. 74,893. (No model.)

*To all whom it may concern:*

Be it known that I, DAVID FERGUSON GRAHAM, a citizen of the United States, residing at Springfield, in the county of Hampden and State of Massachusetts, have invented certain new and useful Improvements in Clutch Adjustments for Motor-Carriages, &c., of which the following is a specification.

This invention relates to clutch adjustments, and it has particular relation to an improved adjustment mechanism which is especially adapted for effective use in connection with the clutch mechanisms of automobiles and vehicles requiring a similar condition of clutch mechanism and adjustment control thereof.

The object of my invention is to provide a simple and improved clutch adjustment which can be readily and conveniently operated to perfectly govern the relative pressure or bearing of the operative members or parts of the clutch and which will, furthermore, possess advantages in point of safety, accuracy, and general efficiency.

In the drawings, Figure 1 is a side elevation of a clutch mechanism, partly in section, embodying my invention. Fig. 2 is a longitudinal sectional view taken on the line *w w*, Fig. 1, through the adjustment devices of the clutch. Figs. 3 and 4 are respectively detail transverse sections taken on the lines *x x* and *y y*, Fig. 1. Fig. 5 is a detail face view, partly broken away, of the peripheral portion of the outer clutch member.

Corresponding parts in all the figures are denoted by the same reference characters.

Referring to the drawings, 1 designates a gear forming the main clutch member, against the inner face 2 of the rim portion of which are adapted to bear shoes 3, arranged at diametrically opposite sides, these parts being in the main of any adapted or suitable construction. It will be understood that the shoes 3 are arranged interiorly of the gear 1, and they comprise a segmental contact plate or shoe proper, 4, carried by an inwardly-projecting stem portion 5, which latter is adapted to slide between suitable guide-plates, as at 6, arranged, respectively, at opposite sides of a tubular shaft 7, centered with respect to the gear 1 and passing transversely therethrough.

The shoe members 3 are carried upon the respective ends of a shaft 8, which passes transversely through the shaft 7, openings, as at 9, being provided in the latter for the accommodation of said shaft 8. The end portions of the shaft 8 are respectively provided with right and left hand screw-threads, as at 10 and 11, which engage corresponding threaded openings 12 in the respective shoe members 3, whereby said shoe members are carried upon their operating-shaft 8 and are adapted to be forced outwardly and drawn inwardly by revolution of said shaft, the shoe members being retained in their operative movement, as just described, by the contact of their side edges with the guide-plates 6, as will be readily understood.

To operate the shaft 8 to cause operation of the shoe members, said shaft is centrally provided with a gear 13, which is contained within the tubular shaft 7 and is adapted to be engaged by a suitable rack-bar, as at 14, interiorly arranged within said shaft 7 and operating in a longitudinal plane with respect thereto, said rack-bar being maintained by a sliding connection with a feather, as at 15, interiorly carried by the shaft 7. The rack-bar 14 may be operated in any suitable or desired manner, and the shaft 7 may be secured between the guide-plates 6 by keys, as at 16, or in any other suitable or adapted manner, and it will be furthermore understood that said guide-plates and shaft 7, as well as the shoe members 3 and their carrying-shaft 8, are all relatively assembled interiorly with respect to the clutch member 1.

It will be noted that if the gear 13 had a fixed connection with the shaft 8 no adjustment of the shoe members 3 with relation to their outer bearing contact against the clutch member 1 would be permitted after the parts were assembled together, the degree of movement of the shoe members being regulated by the threaded connection between the same and the shaft 8. I therefore mount said gear 13 loosely upon its shaft 8 and provide an adjustable locking connection of said gear with its shaft. This adjustable connection is formed by a cross pin or stud 17, having a transverse projection with respect to the shaft 8 and carried upon a longitudinal spring-actuated rod 18, slidably operating in a central bore 19 in the shaft 8, said pin being adapted to engage radially-arranged recesses 20 in one face of the gear 13, whereby said gear is locked in position with respect to its shaft 8. Said cross-pin 17 preferably extends transversely through the shaft 8 and projects at diametrically opposite sides of the same for purposes of more positive connection and strength, and the face of the gear 13 is correspondingly recessed. To enable a finer degree of adjustment, a plurality of sets of recesses 20 are provided in the gear 13, any one of which sets are adapted for the engagement of the cross pin or stud 17. The rod 18, which is slidable in a longitudinal plane in its bore within the shaft 8, is spring-actuated, whereby the cross pin or stud 17, which is carried by said rod, will always be normally and automatically retained in engagement with the gear 13, in which connection it will be noted and understood that said gear has projecting side flanges 21 at its periphery, between which the rack-bar 14 operates, whereby said gear is maintained against lateral movement or displacement in the longitudinal plane of the shaft 8. To accommodate the projecting end of the cross pin or stud 17, the shaft 8 is slotted, as at 22, said slot extending in a longitudinal plane. The spring actuation of the rod 18 is preferably accomplished by means of a coiled spring 23, which surrounds the rod between the cross-pin 17 and the outer end of the slot 22.

The bore 19 in the shaft 8 for the accommodation of the rod 18 extends longitudinally through said shaft from end to end, as shown, and the bore in the shoe members for the accommodation of the threaded ends of the shaft 8 also extends entirely through the shoe members, so that it opens at the outer faces of the segmental plate 4, as at 24. The respective ends of the shaft 8 and also the respective ends of the rod 18 are thus exposed at the recesses 24 at the outer faces of the respective plates 4 of the shoe members 3. A bore or recess 25 is also provided through the rim of the clutch member 1, so that when the clutch mechanism within said member 1 is turned to a position in which either of the recesses or openings 24 and the ends of the shaft 8 therein register with said bore-recess 25 the ends of the shaft 8 and the ends of the rod 18 are exposed at the outer side of the rim of the clutch member 1. The ends of the shaft 8, which are exposed at the openings 24 and 25, are provided with transverse grooves 26, adapted for the engagement of a screw-driver or other device, which can be inserted through said openings and operated to turn the shaft. The relative arrangement of the rod 18 and its governing-spring is preferably such that the end of the rod beyond the side of the gear 13 opposite from its recessed face normally projects a short distance beyond the end of the shaft 8 and within the opening 24, as shown at 27.

The operation and advantages of my invention will be readily understood by those skilled in the art to which it appertains. To adjust the shoe members relatively with respect to their bearing against the clutch member 1, it is only necessary to turn the clutch mechanism within the member 1 until the opening 24 having the projecting end 27 of the rod 18 registers with the opening 25 in the member 1, when a screw-driver or similar device may be inserted into engagement with the grooves 26 in the end of the shaft 8. This engagement of the end of the shaft will press the rod 18 inwardly against the tension of its controlling-spring, thus forcing the cross-pin 17 out of the engagement with the recessed face of the gear 13 and enable turning of the shaft 8 independent of any movement of said gear and its operating rack-bar 14. The shaft 8 may be then turned to effect any desired degree of adjustment of the shoe members thereon in either direction, and as soon as the screw-driver or other instrument is withdrawn from the end of the shaft 8 the spring 23 will cause the rod 18 to return to normal position, and thus bring the cross-pin 17 automatically again into locking engagement with the gear 13.

The arrangement of the rod 18 in a bore extending longitudinally entirely through the shaft 8 is an important feature of my invention, inasmuch as if the spring 23 should break or for any other reason the rod 18 should fail to return to normal position and in locking engagement with the gear 13 it would then be simply necessary to turn the mechanism to bring the other end of said rod 18 opposite the opening 25 in the clutch member 1, when said rod could be pushed inwardly by means of any suitable instrument to cause the cross-pin 17 to lock with the gear.

Manifest variation and modification may be made in the detail features of construction and arrangement without departing from the spirit and scope of my invention and improvements. I therefore reserve the right to all such variation and modification as properly comes within the scope of my invention and the terms of the following claims.

Having thus described my invention, I claim and desire to secure by Letters Patent—

1. A clutch adjustment mechanism, comprising shoe members, a rotary shaft having a threaded connection with said shoe members, means for operating said shaft, and means for turning the shaft independent of the means whereby it is normally operated.

2. A clutch adjustment mechanism, comprising shoe members, a rotary shaft operatively carrying said shoe members, means for operating said shaft, means for throwing the operating mechanism of the shaft out of engagement therewith, and means for independently turning said shaft, for the purpose set forth.

3. A clutch adjustment mechanism, comprising shoe members, a rotary shaft having a threaded connection with said shoe members, a gear mounted upon said shaft, means for connecting and disconnecting said gear operatively with relation to said shaft, and means for turning said shaft independently of said gear.

4. A clutch adjustment mechanism, comprising shoe members, a rotary shaft operatively connected therewith, a gear mounted upon said shaft, a rack engaging said gear, means for throwing said gear into and out of operative engagement with the shaft, and means for independently turning the shaft.

5. A clutch adjustment mechanism, comprising shoe members, a rotary shaft having a threaded connection therewith, a gear carried by said shaft, a rack engaging said gear, means for throwing said gear into and out of operative connection with the shaft, and means for independently turning the shaft.

6. A clutch adjustment mechanism, comprising shoe members, a rotary shaft operatively connected therewith, a rod operating in a longitudinal bore in said shaft, and a gear having an operative engagement with said rod.

7. A clutch adjustment mechanism, comprising shoe members, a rotary shaft having a threaded connection therewith, a rod slidably operating in a longitudinal bore in said shaft and carrying a cross pin or stud, means for automatically returning said rod to normal position, and a gear carried by the shaft and having a recessed face engaged by said pin or stud, for the purpose set forth.

8. A clutch adjustment mechanism, comprising shoe members, a rotary shaft having a threaded connection therewith, and provided with a longitudinal bore-opening at the outer face of the shoe members, a rod slidably operating in said bore, and a gear carried by the shaft and having an operative engagement with said rod, for the purpose set forth.

9. A clutch adjustment mechanism, comprising a clutch member having an opening or recess in its rim, shoe members adapted to bear against the inner face of said rim, a rotary shaft having a threaded connection with said shoe members and having its ends exposed at the outer face of the same, said shaft being provided with a longitudinal bore-opening at the outer face of the shoe members, a rod slidably operating in said bore, and a gear carried by said shaft and adapted to be operatively engaged with said rod, for the purpose set forth.

10. A clutch adjustment mechanism, comprising shoe members, a rotary shaft operatively connected therewith, said shaft having a longitudinal bore-opening at both ends at the outer face of the shoe members, a rod extending longitudinally in said bore and having both its ends respectively exposed at the outer face of the shoe members, said rod being adapted to slidably move, operating mechanism for turning the shaft, means for engaging and disengaging said rod with said operating mechanism, and means for maintaining the rod in normal position.

In testimony whereof I have signed my name in the presence of the subscribing witnesses.

DAVID F. GRAHAM.

Witnesses:
J. R. LITTELL,
HERBERT G. WHIPPLE.